US006838674B2

(12) United States Patent
Otto

(10) Patent No.: US 6,838,674 B2
(45) Date of Patent: Jan. 4, 2005

(54) METHOD FOR PRODUCING A DETECTOR ARRAY FOR DETECTION OF ELECTROMAGNETIC RADIATION, AND A DETECTOR ARRAY

(75) Inventor: Walter Otto, Pretzfeld (DE)

(73) Assignee: SIEMENS Aktiengesellschaft, Munich (DE)

( * ) Notice: Subject to any disclaimer, the term of this patent is extended or adjusted under 35 U.S.C. 154(b) by 411 days.

(21) Appl. No.: 09/985,564

(22) Filed: Nov. 5, 2001

(65) Prior Publication Data

US 2002/0056811 A1 May 16, 2002

(30) Foreign Application Priority Data

Nov. 3, 2000 (DE) .......................................... 100 54 680

(51) Int. Cl.[7] .............................................. G01T 1/24
(52) U.S. Cl. .............................. 250/370.11; 250/361 R; 250/367
(58) Field of Search ........................ 250/370.11, 361 R, 250/367

(56) References Cited

U.S. PATENT DOCUMENTS 4,533,489 A * 8/1985 Utts et al. ............... 252/301.17
4,982,095 A * 1/1991 Takahashi et al. .......... 250/367
5,296,163 A   3/1994 Leppert et al.
5,440,129 A   8/1995 Schmidt
6,245,184 B1 * 6/2001 Riedner et al. ............. 156/247

FOREIGN PATENT DOCUMENTS

DE    196 43 644 C1    4/1998
DE    198 42 947 A1    3/2000
EP    0 819 406        1/1998

* cited by examiner

*Primary Examiner*—Constantine Hannaher
*Assistant Examiner*—Shun Lee
(74) *Attorney, Agent, or Firm*—Young & Thompson

(57) ABSTRACT

In a method for producing a detector array for detection of X-ray radiation, a stack is formed from a sequence of layers which are arranged one above the other in a stacking direction and are connected to one another. This results in a layer group, comprising at least one sensor layer composed of a material which is sensitive to that radiation and a separating layer, repeatedly. The stack is then broken down into slabs such that a row sequence in one slab reproduces the layer sequence in the stack. The slab is made contact with, optically or electrically, on at least one of its surface faces. The rows which are formed from the sensor layers in the slab are preferably subdivided by the introduction of separating spaces into individual sensor elements or pixels. A reflector material can be poured into the separating spaces. The method allows the production of relatively large quantities of one-dimensional or multidimensional detector arrays in a simple manner.

17 Claims, 5 Drawing Sheets

Figure 1:
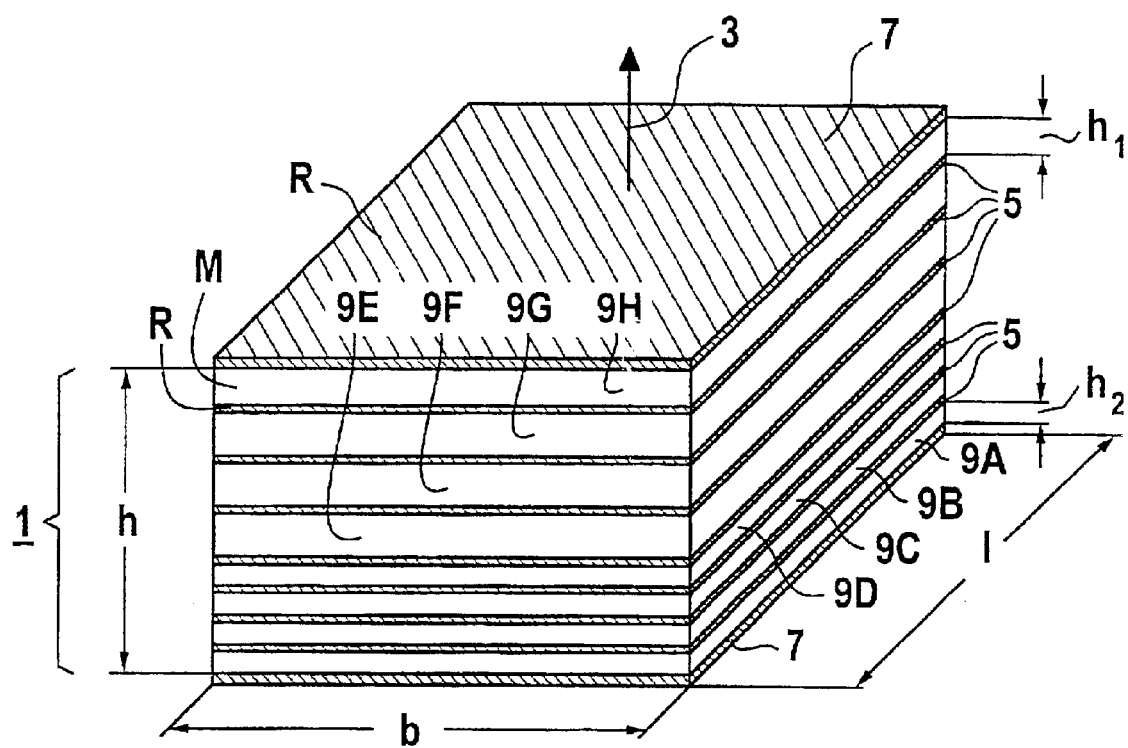

METHOD FOR PRODUCING A DETECTOR ARRAY FOR DETECTION OF ELECTROMAGNETIC RADIATION, AND A DETECTOR ARRAY

The invention relates to a method for producing a detector array for detection of electromagnetic radiation, in particular for detection of X-ray radiation. The invention also relates to a detector array for detection of X-ray radiation.

For computer tomography equipment, or for other equipment in which X-ray radiation or other high-energy radiation must be detected by means of detectors, fluorescent or scintillation materials are used which transfer the X-ray radiation or the high-energy radiation to a different form of electromagnetic radiation, whose spectral range is in the human visual band or can be sensed by a photoelectric receiver. Such a scintillation material, referred to as a UFC ceramic (ultrafast ceramic), is described, for example, in U.S. Pat. No. 5,296,163.

Detectors which are structured in at least one direction are required in order to achieve position resolution for the X-ray signal.

For faster image processing and for reasons related to better utilization of the beam emitted from an X-ray source, it is also known for an X-ray detector to be designed such that it is structured along two mutually perpendicular axes, so that a two-dimensional detector array is formed. Such two-dimensional arrays are disclosed, for example, in U.S. Pat. No. 5,440,129 and EP 0 819 406 A1.

The production of one-dimensional or multidimensional detector arrays with fluorescent material or scintillation material is complex and, particularly when large quantities are involved, results in a high manufacturing cost.

The invention is based on the object of specifying a production method for detector arrays for detection of electromagnetic radiation, by means of which such detector arrays can be produced at low cost in medium and large quantities. A detector array which can be produced easily is also intended to be specified.

The first-mentioned object, relating to the method of the type mentioned initially according to the invention, is achieved in that:
a) a stack is formed from a sequence of layers which are arranged one above the other in a stacking direction and are connected to one another, with a layer group, comprising at least one sensor layer composed of a material which is sensitive to that radiation and a separating layer, being produced repeatedly,
b) that the stack is broken down into slabs such that a row sequence in one slab reproduces the layer sequence in the stack, and
c) that the slab is made contact with, optically or electrically, on at least one of its surface faces.

The stack formation and the subsequent breaking down into slabs makes it possible, in a simple manner, to produce structuring which is suitable for position resolution. The individual rows in the slab can be used as row-like sensor elements of a one-dimensional or multidimensional detector array. To do this, the individual detector rows or detector pixels advantageously need not be processed individually since—as a result of the individual stack layers being connected to one another—they already form a fixed assembly comprising a sensor layer and separating layer. Particularly fast production and further processing are thus possible. If, for example, an array, which is intended for making contact with the slab, having photoelectric receivers, in particular a photodiode array, has its structure matched to the row sequence or to the pixel pattern of the previous slabs from the stack, it is possible using only a single process step to connect all the detector rows or detector pixels to the corresponding receiver associated with them, or to the photodiode associated with them, or to make contact with them.

When the stack is being formed, adjacent layers are, in particular, bonded to one another.

According to one preferred embodiment, a covering layer is applied to one of the surface faces of the slab, in particular before contact is made, so that this surface face is insulated. If the covering layer is designed to be correspondingly thick or robust, it is thus also possible to achieve an increase in the robustness of the slab that is produced. By way of example, the covering layer is produced by pouring on a synthetic resin, thus resulting in a particularly robust assembly comprising the covering layer and slab.

According to another preferred refinement, the rows which are formed from the sensor layers in the slab are subdivided into individual sensor elements, in particular before contact is made and/or after mounting on the covering layer. Each sensor element or sensor pixel thus has a specific amount of the material that is sensitive to the radiation. This makes it possible to produce medium or large quantities of two-dimensional detector arrays in a simple manner.

Preferably—in order to subdivide the rows into sensor elements—separating spaces are incorporated, originating from the face facing away from the covering layer and extending as far as the covering layer. It is thus possible to completely isolate the individual sensor elements or sensor pixels from one another, in an advantageous and simple manner, for example by sawing, milling or ultrasound erosion.

According to one very particularly preferred refinement, a fluorescent or scintillation material which is particularly sensitive to X-ray radiation is used as the material which is sensitive to radiation. The scintillation material may be, for example, one of the UFC ceramics mentioned initially, for example gadolinium oxide-sulfide ceramic.

Furthermore, a reflector material which reflects the radiation emitted from the fluorescent or scintillation material is preferably used for the separating layer. Such a reflector material, which preferably reflects diffusely, is, for example, an epoxy resin which is filled with titanium oxide and is colored white. Since the stack is formed using such a reflector material, this virtually automatically ensures when the stack is subsequently broken down into slabs that the slabs that are produced, together with their detector rows, are not just structured in one spatial direction, but are also optically isolated from one another in this spatial direction. This is in itself adequate for a one-dimensional array.

In order to produce a two-dimensional detector array, the optical isolation of the individual detector elements or detector pixels from one another is preferably carried out in a second spatial direction by introducing a reflector material, which reflects the radiation emitted from the fluorescent material or scintillation material into the separating spaces produced on subdivision of the rows into sensor elements. The reflector material may be the same as that used for the separating layer.

This procedure makes it possible for the individual detector elements to be optically isolated from one another, and from the environment, on four sides, in a simple manner and for large quantities.

Since it can be carried out quickly during production, it is particularly expedient in this case to use a procedure in which the reflector material is poured into the separating spaces.

A reflector material which reflects the radiation emitted from the fluorescent material or scintillation material is preferably also used for the covering layer. This means that the detector elements are also optically isolated from a fifth side. This reflector material may also be the same as that used for the separating layer.

The slab—with its rows or pixel-like sensor elements—is preferably provided on its surface face with photoelectric receivers, in particular with photodiodes, in order to make contact optically. If the covering layer has already been applied to one of the surface faces of the slab, the photoreceivers are arranged on the opposite surface face.

A photodiode array is preferably used in this case whose structure corresponds to the structure of the slab, so that a longitudinally extended (row-like) sensor element or a sensor pixel also has a corresponding associated longitudinally extended photoelectric receiver or an array element of the photodiode array. The optically active surfaces of the photoelectric receivers or photodiodes are in this case made to coincide with, and are optionally optically coupled to, those side faces of the sensor elements that are not yet encased by reflector material.

The object relating to the detector array is achieved according to the invention by a detector array for detection of X-ray radiation, having a number of individual sensor elements which are arranged in the manner of a matrix and each contain a fluorescent or scintillation material which is sensitive to X-ray radiation, are housed enclosed on the sides and on the rear face by a reflector material, and make contact on the front face with a respective photoelectric receiver, in particular with a photodiode.

Such a detector array cannot only be produced easily but also has the advantage that the individual sensor elements are optically completely isolated from adjacent sensor elements, since they are housed, so that it is virtually impossible to see any crosstalk.

Figure 2:
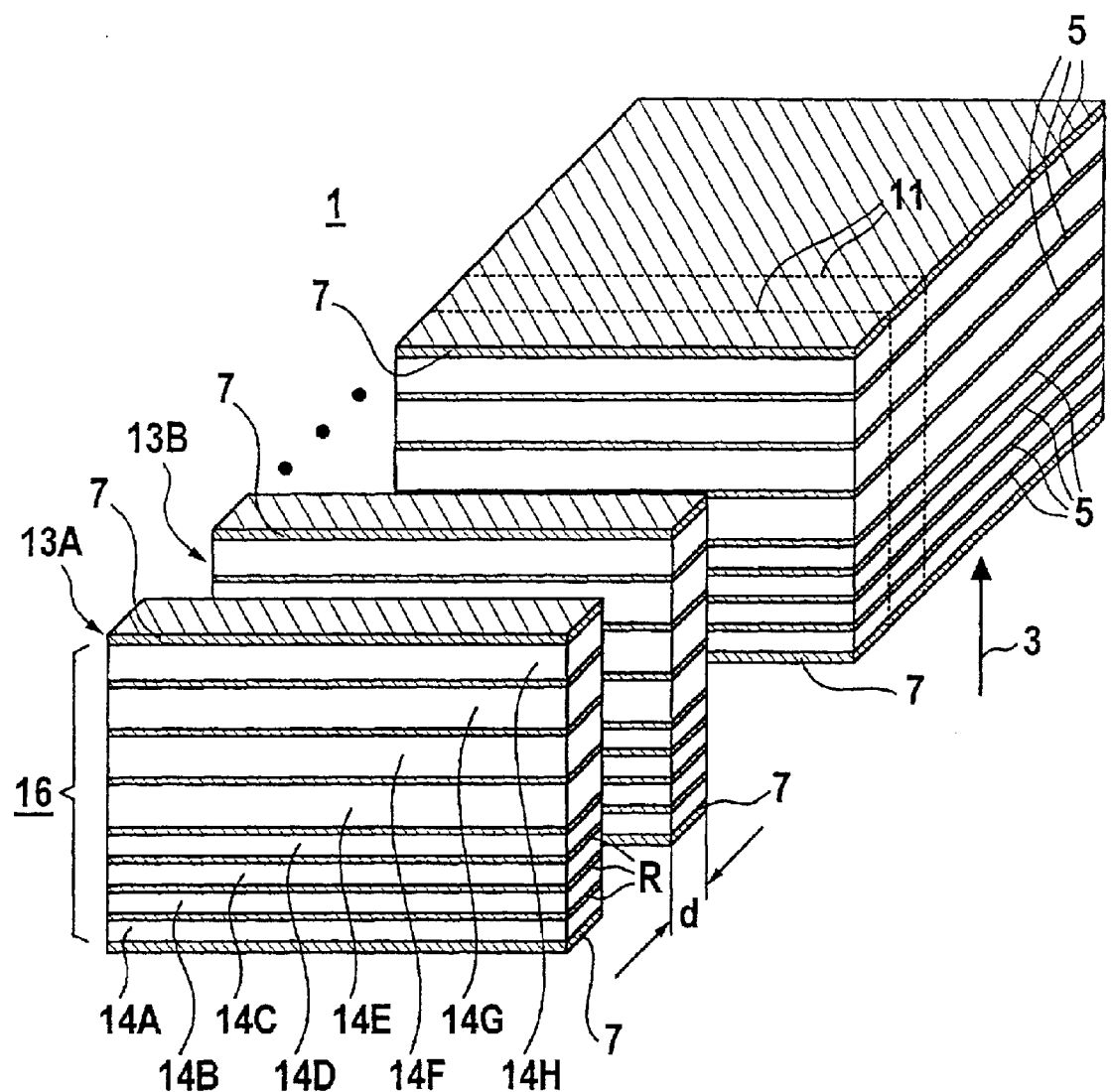
Figure 3:
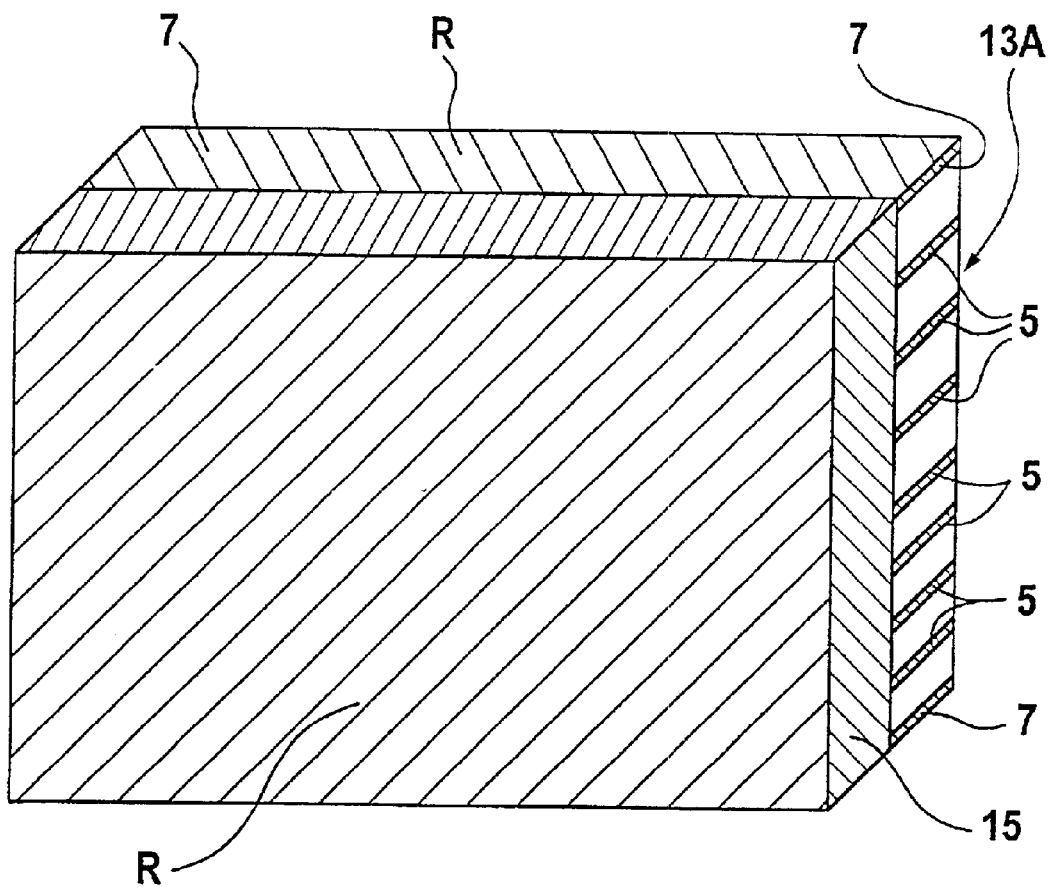
Figure 4:
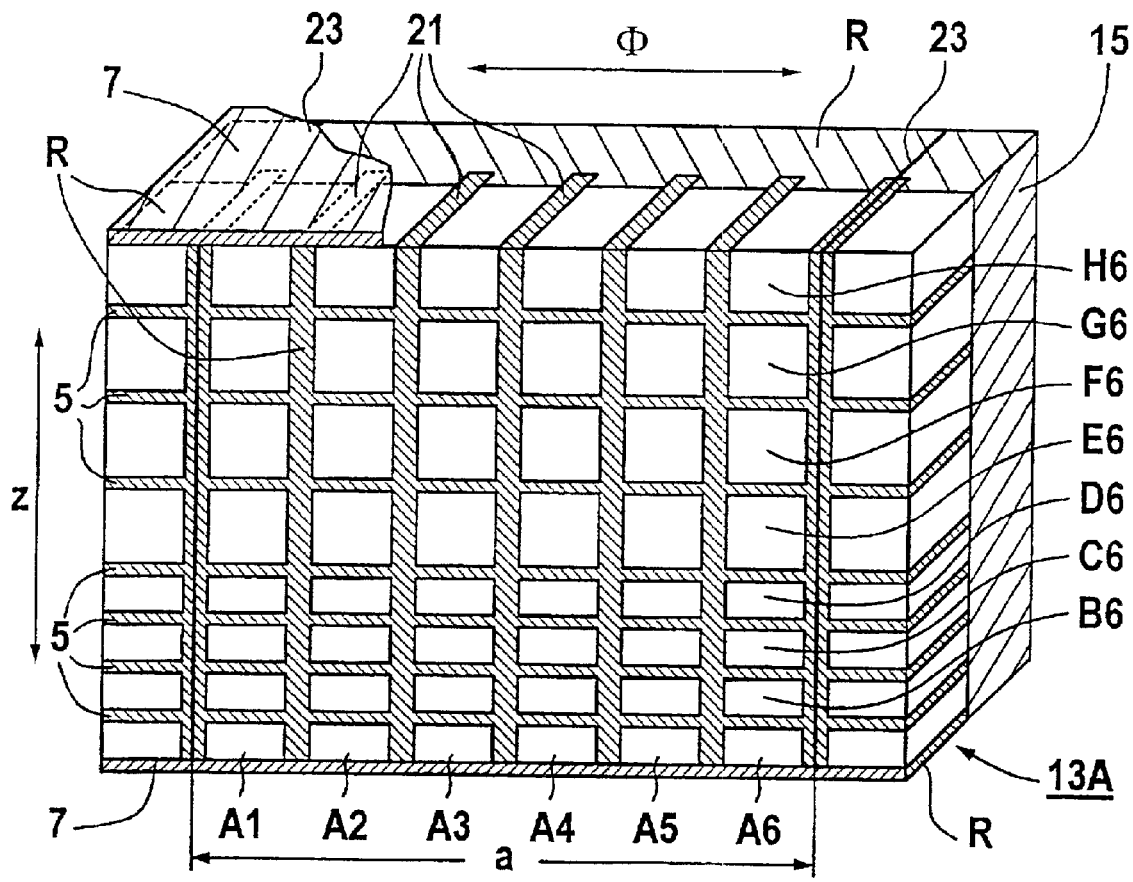
Figure 5:
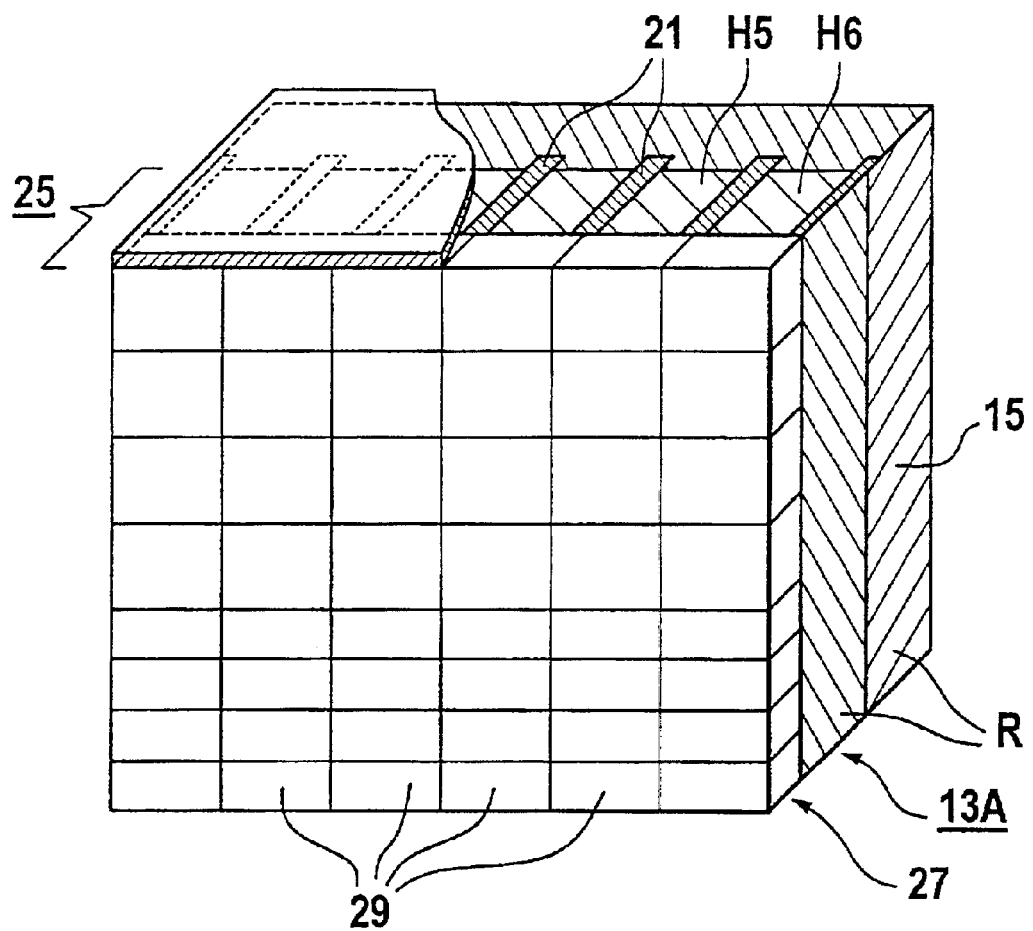

One exemplary embodiment of a production method according to the invention and a detector array according to the invention will be explained in more detail in the following text with reference to FIGS. 1 to 5, in which:

FIG. 1 shows a first method step relating to the formation of a stack,

FIG. 2 shows a second method step relating to the breaking down of the stack into slabs, FIG. 3 shows a third method step relating to the fitting of a covering layer on one surface face of one of the slabs, FIG. 4 shows a fourth method step relating to the incorporation of further structuring into the slab that has been produced, and FIG. 5 shows a fifth method step relating to the production of an optical contact between the slab and photoelectric receivers, and also shows a three-dimensional view of a detector array according to the invention.

FIG. 1 shows a stack 1 which has been formed by arranging a number of layers alternately one above the other, and by in each case bonding them to one another. A layer group, in each case comprising a separating layer 5 and a sensor layer 9A, 9B, 9C, 9D, 9E, 9F, 9G, 9H, in each case occurs repeatedly and cyclically.

A covering layer 7 has been provided on the bottom and on the top of the stack 1. The separating layers 5 and the covering layers 7 are composed of a reflector material R, which is epoxy resin filled with titanium oxide. The sensor layers 9A, 9B, 9C, 9D, 9E, 9F, 9G, 9H are composed of a material M which is sensitive to X-ray radiation, for example of what is referred to as ultrafast ceramic, for example gadolinium oxide-sulfide ceramic, or of a scintillator ceramic, described in U.S. Pat. No. 5,296,163, column 6, line 49 to column 8, line 32.

The reflector material R is, in particular, permeable for X-ray radiation or other high-energy electromagnetic radiation.

The stack formation represents a first structuring step.

In the illustrated exemplary embodiment, two-dimensional detector arrays are produced for computer tomography equipment from the stack 1 in such a manner that the width b of the stack 1 approximately reproduces the extent of the detector array in what is referred to as the φ-direction of the computer tomography equipment. The height h of the stack 1 is selected in a corresponding manner such that the extent of the detector array to be produced is desirable in what is referred to as the z-direction of the computer tomography equipment. In a corresponding manner to this meaning of the edge lengths of the stack 1, the total of eight sensor layers 9A, 9B, 9C, 9D, 9E, 9F, 9G, 9H are of different heights $h_1$, $h_2$.

In another, not explicitly illustrated, exemplary embodiment, the meaning of the edge lengths b, h of the stack 1 could also be interchanged, so that the height h of the stack 1 would correspond to the φ-direction, and the width b to the z-direction.

In the illustrated exemplary embodiment, the length l of the stack 1 has no significance for the size of the detector array to be produced. In fact, the length l indicates only how many slabs 13A, 13B, ... can be produced by sawing the stack 1 in the second method step illustrated in FIG. 2. As FIG. 2 shows, the stack 1 is sawn along cutting planes 11, which are oriented parallel to the stack direction 3, once the adhesive has cured. This results in the slabs 13A with rows 14A, 14B, 14C, 14D, 14E, 14F, 14G, 14H. Each row 14A, 14B, ... is composed of the material M that is sensitive to radiation, and is separated from adjacent rows by reflector material R. The thickness d of the slabs 13A, 13B, ... already corresponds to the thickness of the detector array to be produced, as it is applied to a diode array after production. Typical values for the thickness d are 1.4 mm, and for the heights $h_1$ and $h_2$ of the sensor layers 9A, 9B, 9C, ... 2 mm to 4 mm or 1 mm.

Each of the slabs 13A, 13B, ... can itself be regarded as a one-dimensional detector array 16, whose array elements are the rows 9A, 9B, ...

Then, as illustrated in FIG. 3, one of the surface faces of the side 13A is provided with a covering layer 15, which likewise contains the reflector material R, in particular in order to produce a two-dimensional detector array. The covering layer 15 is applied, for example, by pouring on synthetic resin, to which a white filler is added, by bonding on a reflective foil or by applying white ceramic material. Pouring on synthetic resin also makes the slab 13A more robust.

The rows 14A, 14B, ... formed from the sensor layers 9A, 9B, ... and the slab 13A are then structured in the φ-direction by introducing separating spaces or separating channels 21 running at right angles to the rows 14A, 14B, ..., that is to say parallel to the stacking direction 3 (FIG. 4). This is done by sawing, milling, ultrasound erosion or some other processing method. The separating channels or separating spaces 21 are applied, starting from the side of the slab 13A facing away from the covering layer 15 and extending into the covering layer 15, so that no material M that is sensitive to radiation remains in the area of the separating channels 21. This second structuring step is used to produce a two-dimensional detector array 25 having sensor elements A1, A2, ..., A6, B1, B2, ..., H6. The sizes of the individual sensor elements or sensor pixels A1, A2, ..., A6, B1, B2, ..., H6 are approximately 1 mm×1 mm, up to about 1 mm×2 mm or 1 mm×4 mm.

The reflector material R is poured into the separating channels or separating spaces 21 that have been formed until the separating channels have been filled. This results in the individual sensor elements A1, A2, ..., A6, B1, B2, ..., H6 being completely optically isolated from one another. The workpiece can be introduced into a pouring apparatus (not shown) for this step.

One separating cut 23 is produced in each case in the outermost separating channel on the left-hand side and in the outermost separating channel on the right-hand side, once these channels have been filled with reflector material R and once the reflector material R which has been poured into the separating channels have cured. The separating cuts 23 also lead to the covering layer 15 being cut through completely. The cut width is less than the width of the separating channels. This means that the reflector material R is not all removed during the cutting process, so that the adjacent detector elements A1, B1, C1, D1, E1, F1, G1, H1 or A6, B6, C6, D6, E6, F6, G6, H6 are optically isolated, or remain optically isolated, not only from the array center but also from the environment.

The production of the separating cuts 23 reduces the width b, resulting from the stack width, to the array width a, which is desired in the φ-direction.

Finally, and as shown in FIG. 5, a two-dimensional detector array 25 is produced from the component illustrated in FIG. 4, by a photodiode array 27 being placed on to that surface face of the slab 13A which faces away from the covering layer 15. This surface face of the slab 13A which faces away from the covering layer 15 is the only one of the six possible three-dimensional faces on which the individual sensor elements A1, A2, ..., A6, B1, B2, ..., H6 has not yet been optically shielded once the previous method steps have been carried out. On this face, a photodiode from the photodiode array 27 is in each case associated with one of the sensor elements A1, A2, ..., A6, B1, B2, ..., H6, so that the two-dimensional detector array 25 is formed together with individual detector elements, each comprising a sensor element A1, A2, ..., A6, B1, B2, ..., H6 and a photodiode array element 29.

What is claimed is:

1. A method for producing a two-dimensional detector array (25) for detection of electromagnetic radiation, comprising the steps of:
   a) forming a stack (1) from a sequence of layers which are arranged one above the other in a stacking direction (3) and are connected to one another, said sequence of layers comprising at least one sensor layer (9A, 9B, ..., 9H) composed of a material (M) which is sensitive to said radiation and a separating layer (5), being produced repeatedly,
   b) breaking the stack (1) down into slabs (13A, 13B, ...) such that a row sequence in one slab (13A, 13B, ...) reproduces the layer sequence in the stack (1),
   c) applying a covering layer (15) on one of the surface faces of one slab (13A, 13B, ...),
   d) subdividing the rows of the one slab into individual sensor elements by incorporating separating spaces (21), all separating spaces originating from the face facing away from the covering layer (15) and extending into the covering layer (15),
   e) introducing a reflector material (R) which reflects radiation emitted from said material (M) into the separating spaces (21) produced during the subdivision step, and
   f) contacting the one slab (13A, 13B, ...), optically or electrically, on at least one of its surface faces, the resulting one slab with individual sensor elements being a two-dimensional detector array.

2. The method as claimed in claim 1, wherein, a fluorescent material or scintillation material which is sensitive to X-ray radiation is used as the material (M) which is sensitive to radiation.

3. The method as claimed in claim 2, wherein the reflector material (R) is used for the separating layer (5), reflects radiation emitted from said fluorescent or scintillation material.

4. The method as claimed in claim 2, wherein a reflector material which reflects the fluorescent or scintillation radiation is used for the covering layer (15).

5. The method as claimed in claim 1, with the reflector material (R) being poured into the separating spaces (21).

6. The method as claimed in claim 1, with said sequence of layers (9A, 9B, ... 9H, 5) in the stack (1) being bonded to one another.

7. The method as claimed in claim 1, with the slab (13A, 13B, ...) being provided on its surface face with photoelectric receivers in order to make contact optically.

8. The method of claim 1, wherein the photoelectric receivers are photodiodes (27).

9. The method of claim 1, wherein said covering layer, applied to the first face of the one, is produced by pouring on a synthetic resin.

10. A method for producing a two-dimensional detector array (25) for detection of X-ray radiation, comprising the sequential steps of:
    a) forming a stack (1) of layer groups arranged one above another, each layer group comprising a separating layer (5) and a sensor layer (9A, 9B, 9C, 9D, 9E, 9F, 9G, 9H), each sensor layer being of a sensor material sensitive to X-ray radiation and having a thickness different from the other sensor layers, the stack being provided with a covering layer (7) on a bottommost surface and another covering layer (7) on a topmost surface of the stack (1), the covering layers (7) being composed of a reflector material,
    the stack having a width, a height, and a length,
    the width (b) of the stack being a φ-direction extent,
    the height (h) of the stack, exclusive of the covering layers, being a z-direction extent;
    b) sawing the stack, along cutting planes parallel to the width, into slabs of width and height equal to the stack, each slab being a one-dimensional detector array slab (16) comprised of plural rows of alternating sensor layers and separating layers (5);
    c) applying a third covering layer (15) to a first face of one of the slabs, the covering layer being of a reflector material;
    d) converting the one slab into a two-dimensional detector array (25) by structuring the plural rows, of the one slab, by introducing separating channels (21) running in the height direction at right angles to the rows,
    the separating channels being formed starting from a second face of the one slab facing away from said third covering layer (15) and extending into said third covering layer (15) so that the sensor material all remains in areas between the separating channels,
    each of the areas being between a pair of separating channels and between a pair of separating layers being an individual sensor element of the two-dimensional detector array;

e) pouring reflector material into the separating channels formed in step d) to fill the separating channels, and optically isolate the individual sensor elements;

f) making separating cuts (23) within a selected pair of the filled separating channels to reduce the width (b) to an array width (a) desired in the φ-direction; and g) applying a photodiode array (27), with a matrix of photodiode array elements (29), on the second face of the one slab, each said individual sensor elements being associated with one of the photodiode array elements.

11. The method of claim 10, wherein said third covering layer applied to the first face of the one slab, is produced by pouring on a synthetic resin.

12. A method for producing a two-dimensional detector array for detection of radiation, comprising the sequential steps of:

a) forming a stack of layer groups bonded one above another, each layer group comprising a separating layer and a sensor layer, each sensor layer being of a sensor material sensitive to radiation, the stack being provided with a reflective covering layer on a bottommost surface and another reflective covering layer on a topmost surface of the stack, the reflective covering layers being permeable to said radiation, the stack having a width, a height, and a length;

b) dividing the stack, along dividing planes into slabs of width and height equal to the stack, each slab being a one-dimensional detector array slab comprised of plural rows of alternating sensor layers and separating layers;

c) applying a third covering layer to a first face of one of the slabs;

d) introducing into the one slab separating channels (21) running in the height direction, the separating channels being formed starting from a second face of the one slab facing away from said third covering layer and extending into said third covering layer, individual areas between a pair of separating channels and between a pair of separating layers being individual sensor elements;

e) pouring reflector material into the separating channels formed in step d) to fill the separating channels, and optically isolate each said individual sensor elements; and f) forming a two-dimensional detector array by applying a photodiode array, with a matrix of photodiode array elements, on the second face of the one slab, the individual sensor elements being associated with corresponding ones of the photodiode array elements.

13. The method of claim 12, comprising the further step of:

making separating cuts (23) within a selected pair of the filled separating channels to reduce the width of the one slab to an array width desired in the φ-direction.

14. The method of claim 12, wherein said third covering layer applied to the first face of the one slab, is produced by pouring on a synthetic resin.

15. The method of claim 12, wherein sensor layer comprises one of a gadolinium oxide-sulfide ceramic and a scintillator ceramic.

16. The method of claim 12, wherein the step of introducing separating channels comprises ultrasound erosion.

17. The method of claim 12, wherein the step of introducing separating channels comprises one of milling and sawing.

* * * * *